United States Patent
Taylor

(10) Patent No.: US 9,877,436 B1
(45) Date of Patent: Jan. 30, 2018

(54) PIVOTING HANGING BASKETS ASSEMBLAGE WEIGHTED FOR GRAVITY CLOSURE

(71) Applicant: Robert Lee Taylor, Oakland, CA (US)

(72) Inventor: Robert Lee Taylor, Oakland, CA (US)

( * ) Notice: Subject to any disclaimer, the term of this patent is extended or adjusted under 35 U.S.C. 154(b) by 0 days.

(21) Appl. No.: 14/998,415

(22) Filed: Jan. 4, 2016

(51) Int. Cl.
*A01G 9/02* (2006.01)
*A01G 1/00* (2006.01)

(52) U.S. Cl.
CPC .............. *A01G 9/023* (2013.01); *A01G 1/001* (2013.01); *A01G 9/024* (2013.01)

(58) Field of Classification Search
CPC .......... A47F 3/06; A47F 3/063; A47F 5/0025; A47B 46/00; A47B 46/005; A47B 63/065
USPC ........... 211/133.1, 133.3; 312/120, 123, 136, 312/249.7, 271; 108/186, 193
See application file for complete search history.

(56) References Cited

U.S. PATENT DOCUMENTS

| | | | | | |
|---|---|---|---|---|---|
| 462,082 | A | * | 10/1891 | High ................... | A47F 5/12 211/150 |
| 638,443 | A | * | 12/1899 | Canedy ................ | A47B 31/04 108/17 |
| 1,590,444 | A | * | 6/1926 | Salomon ............... | A47B 85/06 312/202 |
| 1,647,723 | A | * | 11/1927 | Casali .................. | A47B 43/00 108/176 |
| 1,883,776 | A | * | 10/1932 | Forsyth ................ | A47F 5/0037 211/44 |
| 3,721,349 | A | * | 3/1973 | Jaffee ................... | A47B 31/00 211/126.1 |
| 3,827,376 | A | * | 8/1974 | Solomon ............... | A47B 43/00 108/177 |
| 4,531,646 | A | * | 7/1985 | Howard ................ | A47F 5/12 108/6 |
| 4,616,891 | A | * | 10/1986 | Jantzen ................ | A47B 49/002 312/216 |
| 5,197,613 | A | * | 3/1993 | Kotlowski ........... | D06F 95/002 211/133.1 |
| 5,370,453 | A | * | 12/1994 | Wolff ................... | A45C 11/16 206/6.1 |
| 5,458,409 | A | * | 10/1995 | Sheng ................... | A47F 3/063 29/434 |
| 5,595,395 | A | * | 1/1997 | Wilson ................. | B62B 1/14 280/47.19 |

(Continued)

FOREIGN PATENT DOCUMENTS

GB 518498 A * 2/1940 ........... A47B 19/002

*Primary Examiner* — Joshua Rodden

(57) ABSTRACT

Hanging baskets assemblage includes a plurality of vertically mounted baskets pivotally suspended in a support framework allowing them to swing freely. Freely pivoting hanging baskets in the assemblage allows the baskets to easily tilt down on one side to expose contents simply with the weight of a hand. The utility is further augmented by an optional ancillary member, which provides a counter balance weight hung on one side of a plurality of baskets to assist gravity to allow the baskets to pivot back to a neutral or closed position. The ancillary member also permits the simultaneous opening and closing of all the baskets offering further utility. One embodiment of said ancillary member has a series of insertion cutouts with lip-hooks that engage with the baskets through an insertion slot in the rigid basket brims, a second embodiment is attached directly to the baskets with coupled eye-screws or other bendable means.

1 Claim, 5 Drawing Sheets

(56) References Cited

U.S. PATENT DOCUMENTS

Figures 1A, 1B:
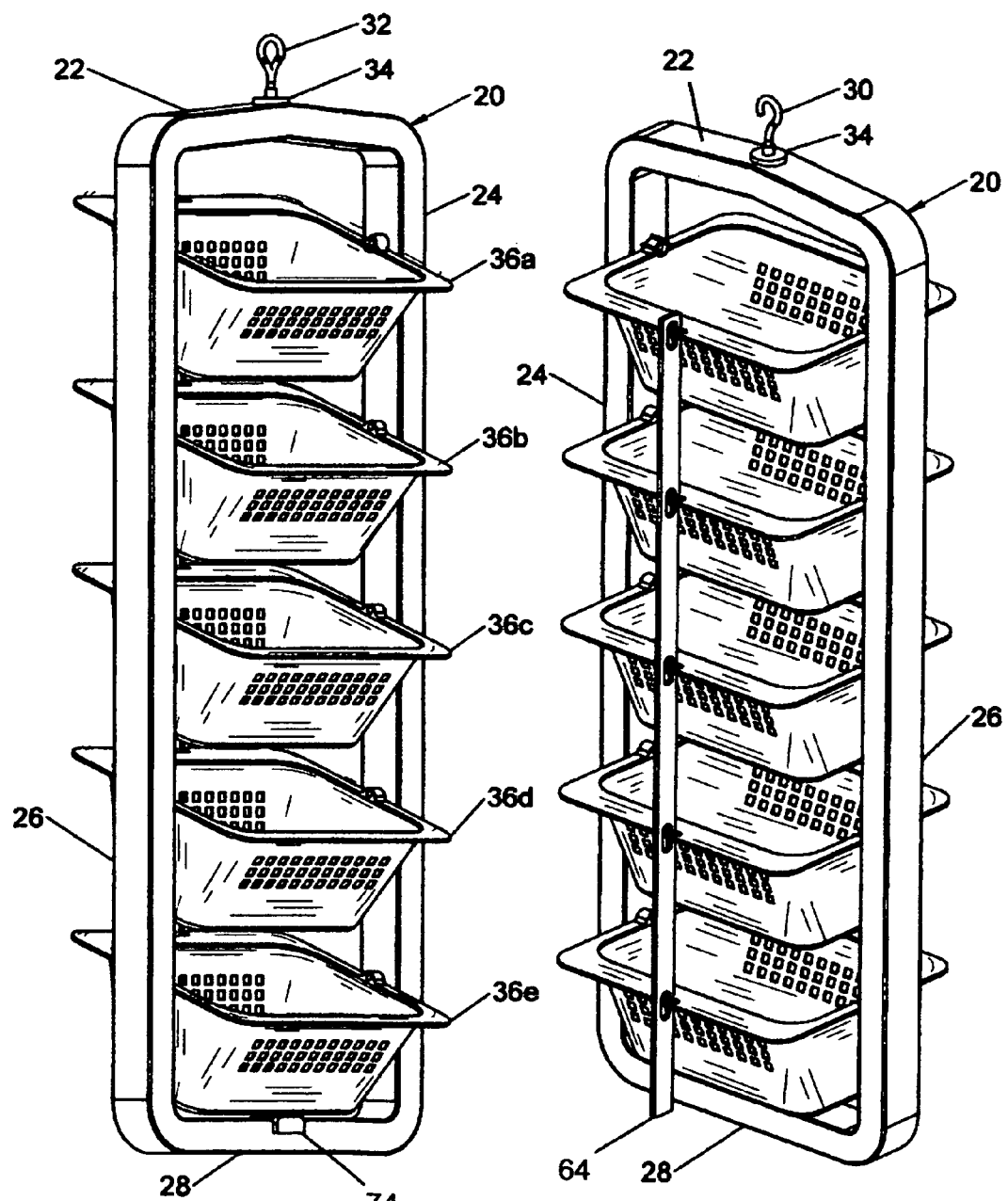

| | | | |
|---|---|---|---|
| 6,322,177 B1* | 11/2001 | Vasudeva | A47B 46/005 206/373 |
| 7,168,715 B1* | 1/2007 | Friedman | B62B 3/006 280/33.991 |
| 8,439,211 B2* | 5/2013 | Emrani | A47B 49/00 211/162 |
| 2002/0027403 A1* | 3/2002 | Vasudeva | A47B 46/005 312/244 |
| 2002/0040880 A1* | 4/2002 | Vasudeva | A47B 46/005 211/99 |
| 2004/0012314 A1* | 1/2004 | Hay | A47B 46/005 312/405.1 |

* cited by examiner

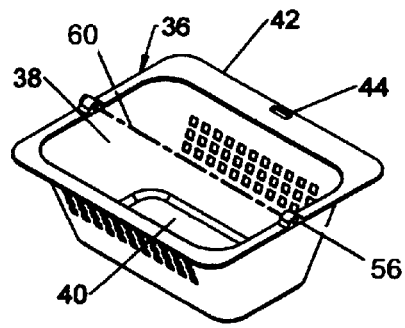
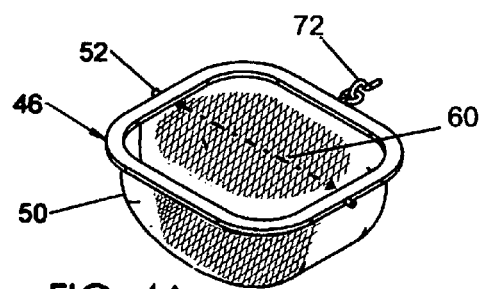
FIG. 3  FIG. 4A
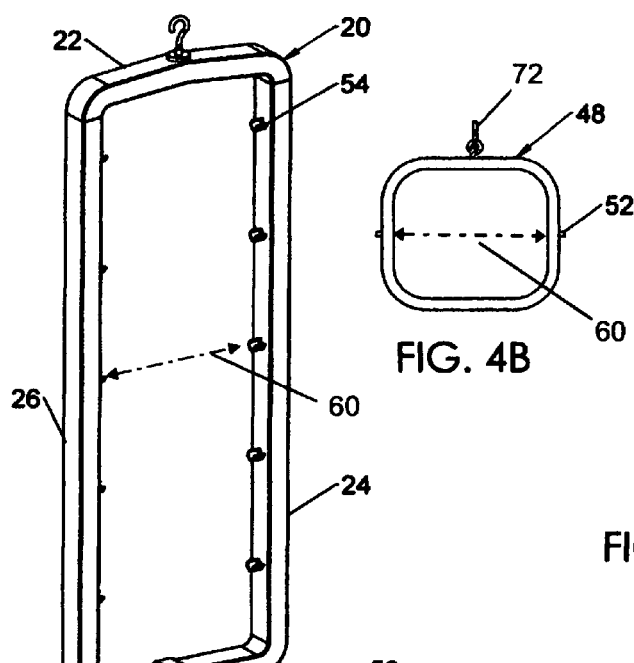
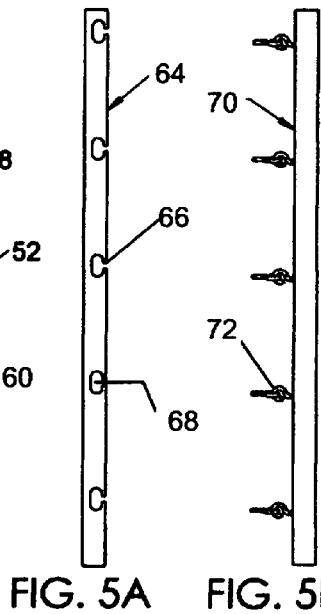
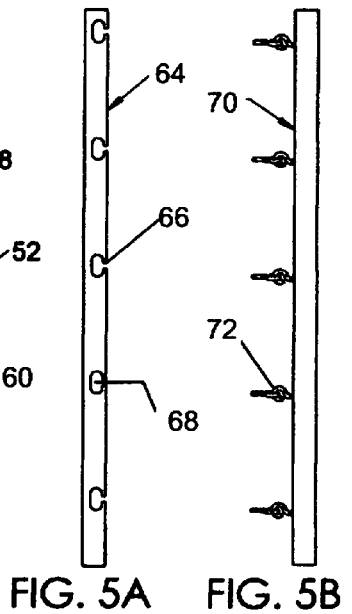
FIG. 4B
FIG. 6  FIG. 5A  FIG. 5B
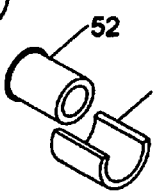
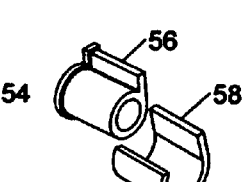
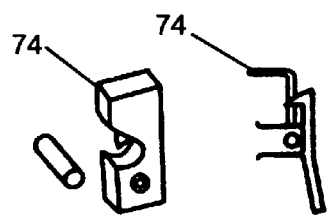
FIG. 7A  FIG. 7B  FIG. 8

PIVOTING HANGING BASKETS ASSEMBLAGE WEIGHTED FOR GRAVITY CLOSURE

CROSS-REFERENCE TO RELATED APPLICATIONS

This is a continuation of application Ser. No. 61/797,318, filed 2012 Dec. 3.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND

Prior Art

The following is a tabulation of some prior art that presently appears relevant:

| U.S. patents | | | |
| --- | --- | --- | --- |
| Pat. No. | Kind Code | Issue Date | Patentee |
| GB518,498 | | Feb. 28, 1940 | Watts |

| U.S. patent application Publication | | | |
| --- | --- | --- | --- |
| Publication Nr. | Kind Code | Issue Date | Applicant |
| 2004/0012314 | A1 | Jan. 22, 2004 | Hay et al. |

In a modern society, the need for storing the innumerable bits and pieces used in our homes and businesses in everyday life has grown exponentially and has fostered an industry dedicated to providing solutions toward this purpose. Modern materials are being used to manufacture a variety of baskets as strictly utilitarian containers. There are now stores exclusively devoted to the sales of storage products, yet their offerings are essentially limited to boxes, shelves, drawers, and stacking baskets or bins.

Stacking storage baskets and bins provide utility for storage while providing a small footprint, but accessing the contents requires a lot of shuffling of containers. In answer to this problem some stacking storage containers are manufactured with one wall lower than the others creating an opening for accessing the contents. Even with the above mentioned modification, removing a single basket from a stack to use in a remote workspace still requires the shifting of containers.

What is needed is a system of baskets that can be accessed easily and efficiently with the least amount of effort.

U.S. application 2004/0012314 (2004) to Hay et al. shows a wall mounted storage unit that allows a collection of bins clustered together which pivot open, as well as be individually removed from the framework. It also provides for the option of manually opening and closing all the bins simultaneously by the use of a bar with indents acting as a guide. Due to the design limitations of rounding the base imposed by the tilting of the bins, these bins have limited utility for holding a large variety of items.

G.B. Patent 518,498 (1940) to Watts shows a collection of trays or storage compartments that interconnects by the use of a strap hingedly attached to the trays so they may be manually opened and closed simultaneously.

It is not enough to have all of the baskets open simultaneously; closing all of them is the other half of the coin in convenience and ease of use. A viable solution would be to introduce the force of gravity to perform the task of closing the baskets.

Further utility can be achieved with the above examples by removing the bar guide or strap and replacing each with a weighted member, this will provide the added advantage of automatically closing the bins simultaneously, thus saving the users valuable time and effort by allowing them to stay focused on their tasks at hand.

Baskets or other such shaped containers provide a superior alternative to rounded bins and trays, as they can hold a greater variety of disparately shaped and sized items. Their generally boxlike form with high sides aids their opening with the weight of a hand on one side. They also transfer some of their weight, through the weighted member, adding to the efficiency of all the baskets in the assembly closing simultaneously.

In order to meet the need for storage where floor space is challenged a number of hanging vertical storage solutions have been introduced to the market, but they are effectively just shelves made of cloth or other similar materials; only good for holding shoes and folded items. An exhaustive sample of these types of hanging storage units can be found by doing a simple keyword search on the internet for images of hanging storage units.

There is a big hole in the options available for hanging storage basket containers for the efficient storage of items that have the tendency to roll or move about, as well as things that are generally thrown into drawers, things like balls, gloves, exercise bands and other sports equipment. In the bedroom there are items like belts, scarves, knit hats, gloves and such that seek storage. For the do-it-yourselfers and crafters there is everything from yarn and knitting needles, to paint brushes and craft materials, along with all the parts used in craft or construction, with storage needs in both shops and garages.

SUMMARY

A pivoting hanging baskets assemblage is presented for storing and displaying all of the miscellaneous items of various lengths and sizes of items strewn throughout homes, garages, offices and other work space such as factories, which provides the user with convenience and ease of use.

The present innovation brings numerous baskets into an assemblage that allows them to hang close to each other in series with a freely pivoting action in conjunction with a weighted member to assist opening and closing primarily by the force of gravity.

The advantage of pivoting hanging baskets assemblage is in the ease of use; the user simply lays their hands on the side of one basket and they all open simultaneously. Hanging baskets hung on pivot pins have the further advantage of gravity to automatically pivot them to the closed or neutral position by merely letting go of the side of the basket. There is no need to manually close them, simply let go of the side of the basket and it along with others engaged in an ancillary member will close automatically.

An ancillary member provides both a counter weight to one side of the basket array to assist gravity in efficiently closing the baskets, as well as a mechanism for simultaneously opening the baskets when the weight of a hand is placed on the side of a basket. The ancillary member will be of sufficient weight, according to the load of disparate baskets, to ensure that gravity automatically and fully closes the sides of each basket with the release of the hand.

The first embodiment can be manufactured employing a series of rigid stand alone baskets molded in plastic or constructed with wood or woven fiber, or other rigid material such as sheet metal. The solid container version will have an ancillary member with insertion cutouts having lip-hooks that engage with an insertion slot centered in the rear brim of each basket for jointly opening and closing the containers. The open mouth of the insertion cutouts in the ancillary member allows for each container to be disengaged from the framework and carried to a remote workspace; great for hobbyist and sewing storage, as well in parts storage for assembly applications.

The baskets will be inserted into both the left and right sides of the vertical support framework by axially positioned pivot pins on the lateral ends of each basket which engage with pivot pin pockets in the sides of the vertical hanging framework positioned at a predetermined space. The brim of each basket is concurrently inserted into a corresponding insertion cutout in an ancillary member that engages with the array of baskets to pivot them open simultaneously. Baskets made of sturdier materials capable of standing on their own will have improved utility as they can be disengaged from an ancillary member with slotted pockets, which will allow the baskets to be removed individually to remote work spaces.

Another embodiment of the pivoting clustered hanging basket assembly will have baskets of a woven mesh or cloth material with good hanging properties, strung around a rigid rim providing the body of the container. For added utility the mesh version will have an ancillary member attached at the rear of the containers with coupled-eye screws to actuate the pivot of the baskets (such as used on wooden louvered shutters); pull down on any basket and all of them will pivot open. Baskets made of mesh or cloth type materials will be more inclined to be permanently affixed to the framework. The ancillary member in both embodiments will also act a as counter balance to help bring the baskets to the neutral or closed position.

In both of the above embodiments, it would be useful to have a hanger hook or loop at the top of the framework for suspending the assembly which can conform to various storage conditions. It would also improve its utility to have a rotating mechanism just below the hanger, this will allow a number of the units to be hung together parallel to each other in storage and then rotated perpendicular for access; in this way more pivoting clustered hanging storage basket units can be stored in a given space.

Pivoting clustered hanging storage baskets mounted on a free standing base can provide storage in environments short of closet space; thus further expanding their utility. These stand alone assemblies can be made in numerous configurations for use in a variety of spaces in homes and offices. Adding wheels to the platform or base that holds a series of the pivoting clustered hanging storage container assemblies on a portable garment rack, or cart built for that purpose, can achieve an expanded utility. A duet of the pivoting clustered hanging storage baskets mounted back to back on a wheeled cart would have near universal appeal for many applications in homes and in offices.

The summary of the embodiment above contains considerable detail; it is provided to illustrate some selected embodiments of the embodiment and should not be considered as limiting the possibility of the invention. Conceivable embodiments may also include suitable variations in the shape, material, the construction method, as well as the size of the framework and baskets, along with the means of portability.

BRIEF DESCRIPTION OF THE SEVERAL VIEWS OF THE DRAWING(S)

Drawings—Figures

The appended drawings illustrate the method and system of the embodiment, it will be understood that such drawing's represent select embodiments of the embodiment and, therefore, are not meant to limit its possibility regarding other embodiments which the embodiment may suggest or contemplate.

Figures 2A, 2B:
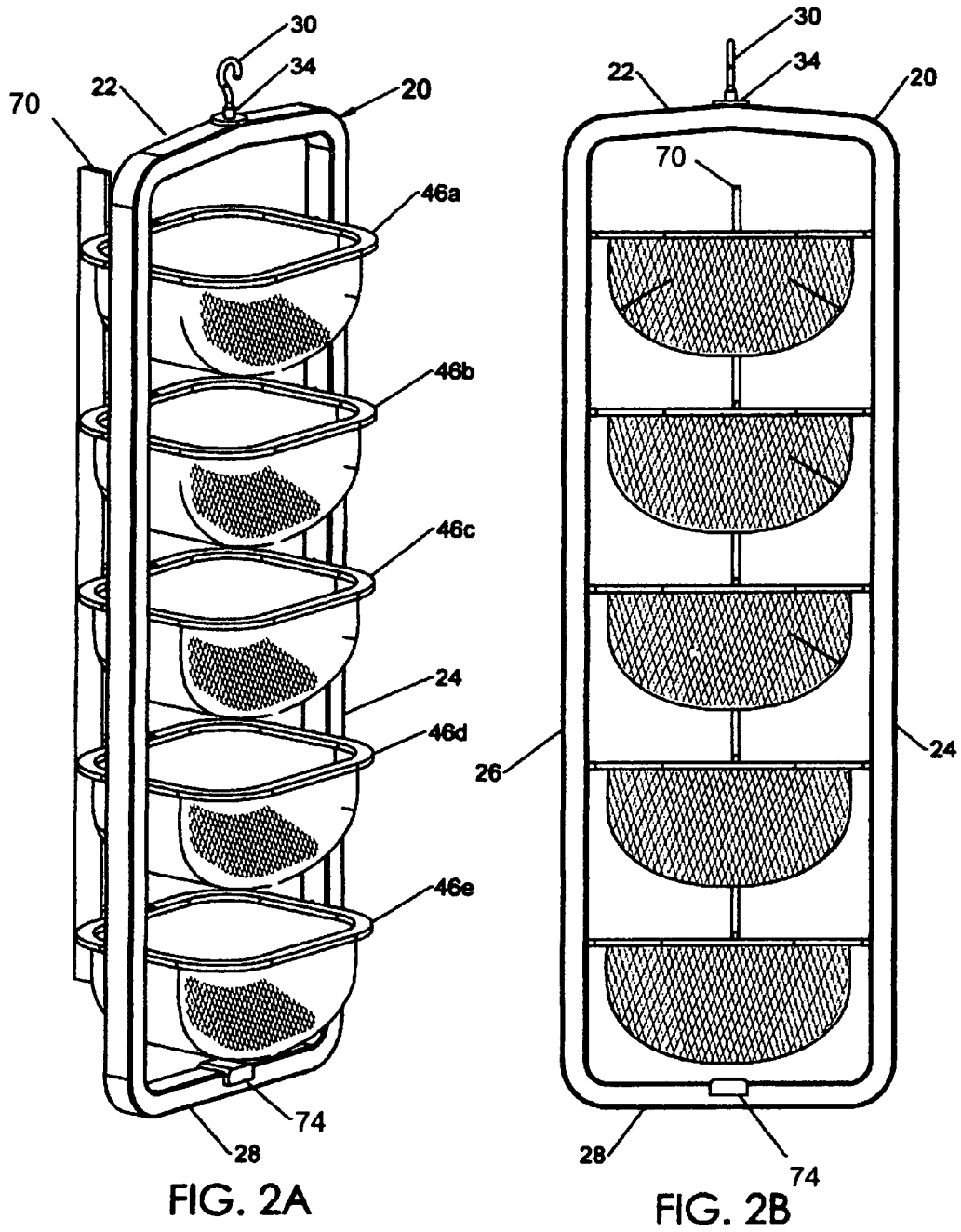

Therefore:

FIG. 1A is a front perspective view of a pivoting hanging storage baskets assembly, with rigid stand alone baskets in a pivoted open position FIG. 1B is a rear perspective view of the assembly, with rigid stand alone baskets in their neutral or closed FIG. 2A is a front perspective view of a pivoting hanging storage baskets with flexible material baskets, in a pivoted open position FIG. 2B is a rear view showing the flexible baskets pivoted to an open position.

Figure 9A:
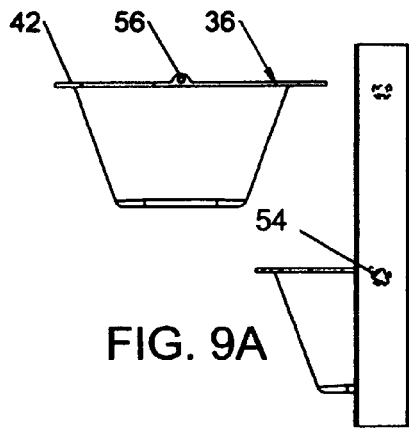
Figure 9B:
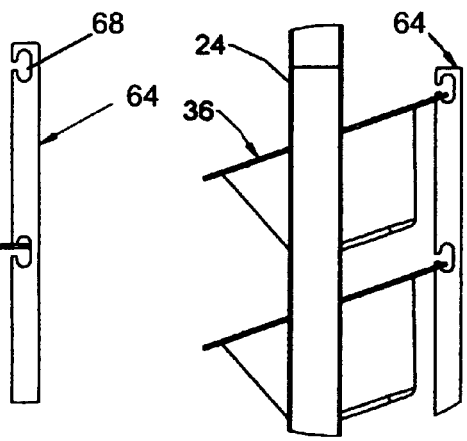
Figure 10:
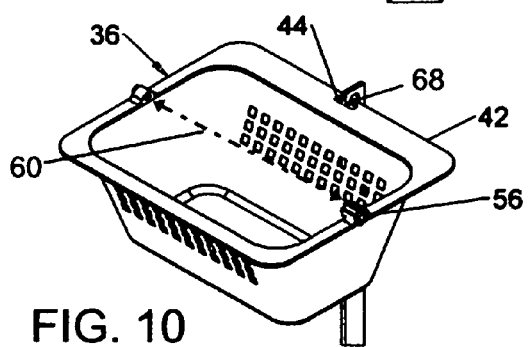
Figure 11:
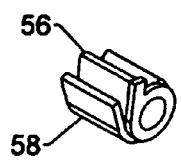
Figure 12A:
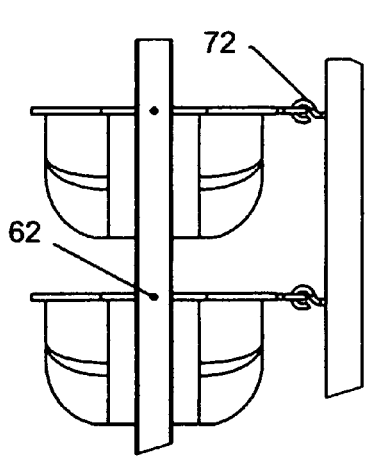
Figure 12B:
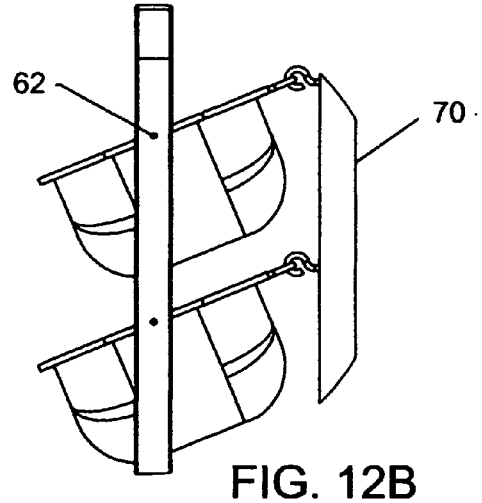
Figure 13:
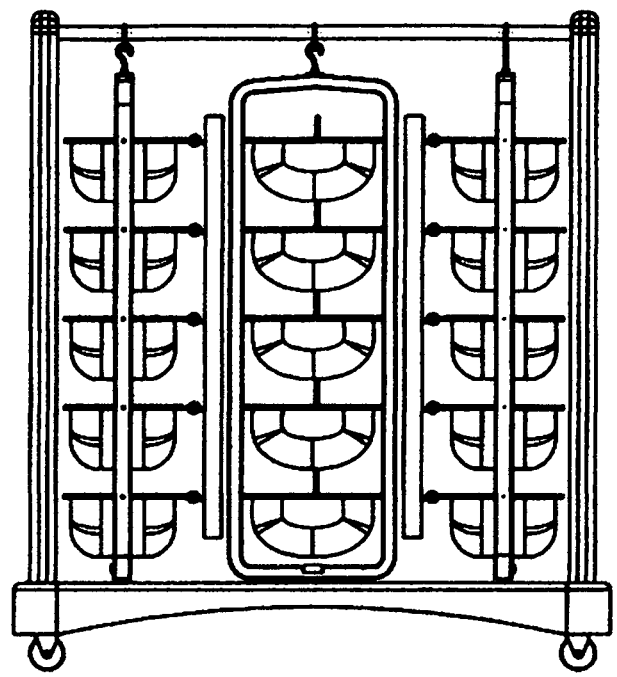

FIG. 3 is a perspective view of a rigid basket with insertion slot in the brim and axially positioned pivot pins FIG. 4A is a perspective view of a flexible basket with hook and eye attachment and axially positioned pivot pins extending from the rigid rim FIG. 4B is a top view of the rigid rim for the flexible basket with hook and eye attachment and axially positioned pivot pins extending from ends of the rigid rim FIG. 5A is a side view of the ancillary member with insertion cutouts FIG. 5B a side view of the ancillary member with coupled eye-screw attachments FIG. 6 is a perspective view of the vertical support framework FIGS. 7A, 7B, pivoting means; pivot pin and pivot pocket, pivot pin and pivot pocket FIG. 8 an example of a couple quick release catches FIG. 9A side view of rigid basket unit in neutral or closed position, showing basket being removed from the pivot pin pocket and ancillary member insertion cutout FIG. 9B side view of rigid basket unit in pivoted or open position for accessing contents FIG. 10 perspective view of rigid basket showing pivot pin and brim insertion slot engaged with insertion cutout hook FIG. 11 side view of pivot pin engaged with pivot pin pocket FIG. 12A side view of flexible basket unit in neutral or closed position with pivot rivets and ancillary member with couple-eye screw attachments FIG. 12B side view of flexible basket unit in pivoted or open position FIG. 13 is an illustration of a plurality of the second embodiment with flexible baskets mounted on a wheeled base.

Figure 14:
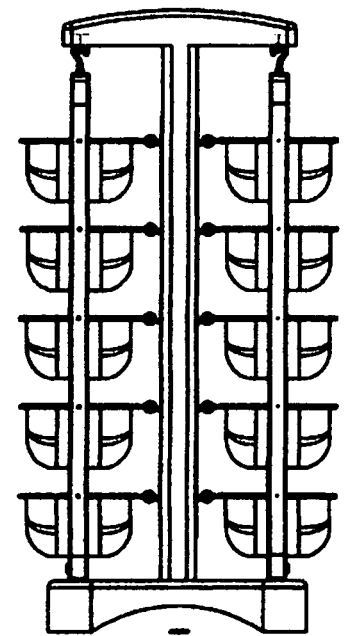

FIG. 14 is an illustration of a duet of the second embodiment with flexible baskets mounted on a base.

Drawings - Reference Numerals

| | |
|---|---|
| 20. vertical support framework | 22. top cross member |
| 24. right vertical side rail | 26. left vertical side rail |
| 28. bottom cross member | 30. framework hanger hook |
| 32. framework hanger eye-loop | 34. hanger mechanism |
| 36. rigid basket (a,b,c,d,e) | 38. rigid wall |
| 40. rigid base | 42. rigid brim |
| 44. brim insertion slot | 46. flexible basket (a, b, c, d, e) |
| 48. flexible basket rigid rim | 50. flexible mesh basket form |
| 52. pivot pin | 54. pivot pin pocket |
| 56. pivot pin with flange | 58. pivot pin pocket with flange |
| 60. pivot axis | 62. pivot rivet |
| 64. ancillary member with cutouts | 66. cutout lip-hook |
| 68. insertion cutout | 70. ancillary member w/eye screws |
| 72. coupled eye-screws | 74. quick release catch |

DETAILED DESCRIPTION

Description of First Embodiment

FIG. 1A and FIG. 1B depict the pivoting hanging baskets assemblage of the first embodiment, with rigid baskets. FIG. 1A shows the assembly in its neutral or closed position and FIG. 1B shows the assembly in its pivoted or open position. The pivoting clustered hanging basket assembly includes a vertical support framework 20 FIG. 3 with top and bottom cross members 22 and 28 connected by left and right vertical support rails 26 and 24.

The vertical support rails 26 and 24 include a series of pivot pin pockets 58 substantially opposite from each other on the respective vertical support members spaced at predetermined distances to accommodate a plurality of baskets 36 a,b,c,d,e which are axially aligned on the framework and define a pivot axis 60 that repeats for each basket represented in the array.

FIG. 3 depicts a basket of rigid construction. The rigid basket 36 in FIG. 3 comprises four rigid substantially planar walls 38 which are outstanding from a rigid base 40 to define a space within which items may be stored. The rigid walls 38 of said basket 36 are sloped to allow the baskets to nest with a like basket. The rigid basket 36 also comprises a rigid brim 42 that flairs out from the walls at the top of the basket at a predetermined height.

The lateral sides of each baskets rigid brim 42 include an axially, outwardly projecting pivot pin 56 as shown in FIG. 7A. A pivot pin 56 positioned on each lateral side of the rigid brim 42 are axially aligned with each other and define a pivot axis 60 for the rigid basket 36. When assembling the pivoting clustered basket unit the rigid basket 36 is inserted into the vertical support framework 20, with the basket 36 in the neutral position as depicted in FIG. 9A.

The rigid brim 42 includes a brim insertion slot 44 for engaging with an ancillary member with cutouts 64 to pivot all of the clustered baskets simultaneously. The ancillary member with cutouts 64, having a plurality of insertion cutouts 68 each having a cutout lip-hook 66 at the top and bottom of the insertion cutout 68. The pivot action is triggered as one side of a basket in the array is pivoted or pulled down, by a plurality of cutout lip-hooks 66 acting upon the ancillary member 64 while it engages with each of the basket's brim insertion slots 44; in this way all the baskets in the array simultaneously pivot.

In the embodiment depicted, the framework 20 includes five sets of pivot pockets 54 divide equally between the left vertical side rail 26 and right vertical side rail 24, which are opposed and aligned along a pivot axis 60, each set adapted to receive the corresponding pivot pin 56 of each separate example of basket 36. In the present embodiment the axial pivot pin 56 is a generally cylindrical molded member and includes a tangential or radial projecting pivot, as depicted in FIG. 7B. As depicted in FIG. 11, the pivot pin 56 slides into the pivot pin pocket 58, which also includes a corresponding tangential projecting pivot; the pivots will serve to limit the rotational movement of the basket.

Description of Second Embodiment

FIG. 2A and FIG. 2B shows a second embodiment of pivoting hanging baskets assemblage, with flexible baskets. FIG. 2A shows the assembly in its neutral or closed position and FIG. 2B shows the assembly in its front closed position. The clustered basket assembly includes a vertical support framework FIG. 6 with top and bottom cross members 22 and 28 connected by left and right vertical support members 26 and 24. The vertical support members 26 and 24 include a series of pivot pin pockets 54 substantially opposite from each other on the respective vertical support members spaced at predetermined distances to accommodate a plurality of baskets, which are axially aligned and define an axis 60 that repeats for each basket represented.

FIG. 4A depicts a flexible basket 46 constructed with a rigid basket rim 48 with a flexible mesh basket form 50. The flexible mesh basket form 50 in FIG. 4A defines a space within which items may be stored. The lateral sides of each flexible basket rim 48 include an axially, outwardly projecting pivot pin 52 as shown in FIG. 7A. The pivot pin 52 positioned on each lateral side of the rim are axially aligned with each other and define a pivot axis 60 for the flexible basket 46. When assembling the pivoting clustered basket unit the flexible basket 46 is inserted into the vertical support framework 20 with the basket 46 in the neutral position as depicted in FIG. 12A.

Each basket rim includes a means to accept a set of coupled eye-screws 72 as seen in FIG. 12A for engaging with an ancillary member 70 to pivot all of the clustered baskets simultaneously. The ancillary member with coupled eye-screws 70 shares a set of coupled eye-screws 72 with each of the flexible baskets 46. The pivot action is activated by a plurality of couple eye-screws 72 acting on the ancillary member 70 engaging with each of the basket's rims, so when one side of any basket in the array is pivoted or pulled down all of the baskets pivot or open simultaneously as depicted in FIG. 12B.

In the embodiment depicted, the framework 20 includes five sets of the pivot pin pockets 54 divide between the right vertical side rail 24 and left vertical side rail 26, which are opposed and aligned along a pivot axis 60, each set adapted to receive the corresponding pivot pin 52 of each separate example of basket 46. The basket rim 48 and the vertical support member 20 are preferably manufactured from a molded plastic material such as polypropylene, but can be made of any variety of rigid materials including but not limited to metal and wood. The flexible mesh basket form 50 can be made with a variety of flexible materials including polypropylene fibers.

The pivoting hanging baskets assemblage will be housed in a vertical support framework 20 with a framework hanger hook 30, or alternatively a framework hanger eye-loop 32.

CONCLUSION OR RAMIFICATION

Thus the reader will see that at least one embodiment of the pivoting hanging baskets assemblage provides greater utility over the prior art, providing an ease of accessing by the simple weight of ones hand and the assistance of gravity to close the array after releasing ones hold on a basket.

While the above descriptions contain much specificity, these should not be construed as limitations on the scope, but rather as an exemplification of several embodiments thereof. Many other variations are possible for example . . . . Though there are five basket containers depicted in the embodiments above, any number of baskets may be utilized in the practice of the design. The ancillary member for pivoting the baskets could be replaced with a gear or pulley system nestled within the vertical support rails.

The framework in the first and second embodiment can be made in modular sections for easier packaging and shipping, the framework in the third embodiment can be of any bendable material such as rope, cable, braided fabric, or woven fibers. Besides the pivot pin method for connecting the baskets, the pivoting action can be accomplished by numerous other methods including but not limited to pivot rivets, fulcrum, and fulcrum guide, with the S hook 64 being replaced with a lanyard clip or split key ring.

It is contemplated that the baskets in the first and second embodiments have a oblong shape and be substantially made of polypropylene, however they can also be oval, round, or octagonal, etc., and different sizes and materials such as metal, wood, composite or any other traditional material.

Accordingly, the scope should be determined not by the embodiments illustrated, but by the appended claims and their legal equivalents.

BENEFITS

Sides of all baskets in the assemblage simultaneously pivot down for easier to access to their contents Side of baskets pivot down for easier to access contents Baskets automatically pivot to closed or neutral position using gravity Allows for a plurality of baskets hanging in a given space Narrow profile allows assemblage to hang mid counter Assemblage can be used in closets, garages, offices, factories and other work spaces.

I claim:

1. A pivoting hanging basket system with automatic closing comprising:
    a cluster of pivoting hanging baskets of complementary size and material,
    a vertical support framework in which to suspend said pivoting hanging baskets sufficient to cluster a predetermined number of said baskets,
    connectors for attaching said pivoting hanging baskets to said vertical support framework that allows said baskets to pivot freely,
    an ancillary member for simultaneously pivoting said pivoting hanging baskets to provide access to all the baskets concurrently, which is a counter weight to assist gravity in automatically bringing said pivoting hanging baskets into a neutral or closed position,
    said pivoting hanging baskets are each capped by a brim at a predetermined height,
    wherein said brim of each basket has a corresponding insertion slot at a predetermined point along one side of the brim to engage with said ancillary member,
    the ancillary member has a plurality of insertion cutouts for engaging with the insertion slots on the brims of said pivoting hanging baskets'
    wherein said insertion cutouts having lip-hooks at mouths of the said insertion cutouts for engaging with respective ones of the insertion slots on said brims,
    whereby the plurality of hanging baskets can be clustered close together to maximize space, while pivoting to allow for easy access, with gravity acting to close said pivoting hanging baskets.

* * * * *